US010349587B2

(12) United States Patent
Einav

(10) Patent No.: US 10,349,587 B2
(45) Date of Patent: Jul. 16, 2019

(54) INTEGRAL DRIP IRRIGATION EMITTER WITH AN EASY SPREADABLE EXIT POOL

(71) Applicant: Rivulis Irrigation Ltd., M.P. ha'amakin (IL)

(72) Inventor: Zvi Einav, M.P. Ha'amakim (IL)

(73) Assignee: Rivulis Irrigation Ltd., M.P. Ha'amakin (IL)

( * ) Notice: Subject to any disclaimer, the term of this patent is extended or adjusted under 35 U.S.C. 154(b) by 222 days.

(21) Appl. No.: 14/416,274

(22) PCT Filed: Jul. 23, 2013

(86) PCT No.: PCT/IL2013/050624
§ 371 (c)(1),
(2) Date: Jan. 21, 2015

(87) PCT Pub. No.: WO2014/016832
PCT Pub. Date: Jan. 30, 2014

(65) Prior Publication Data
US 2015/0201568 A1 Jul. 23, 2015

(30) Foreign Application Priority Data
Jul. 24, 2012 (IL) .......................... 221089

(51) Int. Cl.
A01G 25/02 (2006.01)
A01G 25/06 (2006.01)
E02B 1/00 (2006.01)
(52) U.S. Cl.
CPC ........... A01G 25/02 (2013.01); A01G 25/023 (2013.01); E02B 1/00 (2013.01); A01G 25/06 (2013.01); Y02A 40/237 (2018.01)

(58) Field of Classification Search
CPC ....... A01G 25/02; A01G 25/023; A01G 25/06
(Continued)

(56) References Cited

U.S. PATENT DOCUMENTS 3,293,861 A 12/1966 Hinde
3,993,248 A * 11/1976 Harmony ............... A01G 25/02
239/107
(Continued)

FOREIGN PATENT DOCUMENTS

IL 105745 10/1995
WO 2007/046104 4/2007
(Continued)

Primary Examiner — Arthur O. Hall
Assistant Examiner — Joseph A Greenlund
(74) Attorney, Agent, or Firm — Rodney J. Fuller; Booth Udall Fuller, PLC

(57) ABSTRACT

An integral, discrete, drip irrigation emitter that comprises means for facilitating spreading of its water exit "pool" U configured, in cross section, "legs", so that after affixing the drip emitter onto the inner wall surface of the hose, and following water pressure increase within the hose, an elastic movement of a sector of the hose's wall that is framed and delineated as a consequence of affixing the circumferential rim of the exit pool onto the inner wall of the hose, will take place onto opening a water outlet opening, and from the time the water pressure in the hose decreases, closing of the water outlet opening would occur, and a drip irrigation hose embedding at least one such emitter in it, and a general method for opening and closing water outlet openings in such hose, wherein the opening and closing is performed in accordance with and in correlation to the water pressure prevailing in the hose.

12 Claims, 11 Drawing Sheets

(58) Field of Classification Search
USPC .................. 239/542, 547, 568, 533.1, 533.13
See application file for complete search history.

(56) References Cited

U.S. PATENT DOCUMENTS

| | | | | |
|---|---|---|---|---|
| 4,053,109 A * | 10/1977 | Gilead | ................... | A01G 25/02 239/542 |
| 4,077,571 A | 3/1978 | Harmony | | |
| 5,141,360 A * | 8/1992 | Zeman | ................... | A01G 25/02 138/115 |
| 5,183,208 A * | 2/1993 | Cohen | ................... | A01G 25/023 239/542 |
| 5,203,503 A * | 4/1993 | Cohen | ................... | A01G 25/023 239/1 |
| 5,294,058 A * | 3/1994 | Einav | ................... | A01G 25/023 239/533.1 |
| 5,522,551 A | 6/1996 | Defrank | | |
| 5,634,594 A * | 6/1997 | Cohen | ................... | A01G 25/023 239/542 |
| 5,785,785 A * | 7/1998 | Delmer | ................ | A01G 25/026 156/203 |
| 5,865,377 A | 2/1999 | Defrank | | |
| 6,027,048 A * | 2/2000 | Mehoudar | ............ | A01G 25/023 138/42 |
| 6,382,530 B1 * | 5/2002 | Perkins | ................ | A01G 25/023 239/542 |
| 6,513,734 B2 * | 2/2003 | Bertolotti | ............. | A01G 25/023 239/542 |
| 6,866,761 B2 * | 3/2005 | Bjerke | ................. | E04B 1/7007 204/230.2 |
| 7,175,113 B2 * | 2/2007 | Cohen | ................... | A01G 25/023 239/542 |
| 7,445,168 B2 * | 11/2008 | Ruskin | ................. | A01G 25/023 239/542 |
| 7,681,805 B2 | 3/2010 | Belford | | |
| 7,735,758 B2 * | 6/2010 | Cohen | ................... | A01G 25/023 239/542 |
| 8,096,491 B2 * | 1/2012 | Lutzki | ..................... | F16K 23/00 239/533.1 |
| 8,141,589 B2 * | 3/2012 | Socolsky | ............. | A01G 25/023 138/42 |
| 8,317,111 B2 * | 11/2012 | Cohen | ................. | A01G 25/023 239/542 |
| 8,511,586 B2 * | 8/2013 | Einav | ................... | A01G 25/023 239/542 |
| 8,763,934 B2 * | 7/2014 | Patel | .................... | A01G 25/023 239/542 |
| 8,882,004 B2 * | 11/2014 | Gorney | ................ | A01G 25/023 239/542 |
| 9,386,752 B2 * | 7/2016 | Einav | ................... | A01G 25/023 |
| 9,485,923 B2 * | 11/2016 | Ensworth | ............. | A01G 25/026 |
| 2002/0088877 A1 | 7/2002 | Bertolotti | | |
| 2003/0150940 A1 * | 8/2003 | Vildibill | ............... | A01G 25/023 239/542 |
| 2005/0258279 A1 * | 11/2005 | Harrold | ................. | A01G 25/02 239/542 |
| 2012/0012682 A1 * | 1/2012 | Einav | ........................ | B05B 1/20 239/542 |
| 2015/0201568 A1 * | 7/2015 | Einav | ................... | A01G 25/023 239/542 |

FOREIGN PATENT DOCUMENTS

| | | |
|---|---|---|
| WO | 2011051936 | 5/2011 |
| WO | 2011/092557 | 8/2011 |
| WO | 2012137200 | 10/2012 |

* cited by examiner

1a

1b

INTEGRAL DRIP IRRIGATION EMITTER WITH AN EASY SPREADABLE EXIT POOL

RELATED APPLICATION DATA

This application is the U.S. National Stage of International Application No. PCT/IL2013/050624, filed Jul. 23, 2013, which claims the benefit of and priority to Israel Patent Application No. 221089, filed Jul. 24, 2012, the contents of each of which are hereby incorporated by reference in their entireties for all purposes.

FIELD OF THE INVENTION

The invention, the subject matter of this application, is found in the field of integral drip irrigation emitters (known also as—drippers, drip emitters), namely—in the field of drippers that are formed as discrete units and are integrated inside a hose, positioned along its length with spaces one from the other, wherein they are affixed onto the inner wall of the hose and the water outlet openings are formed on their sides in the wall of the hose and connect for water flow passage from the drip irrigation emitters to the external side of the hose (to the agricultural area that is designated/intended to be irrigated).

BACKGROUND OF THE INVENTION

Integral drip irrigation emitters, whose surface areas are adapted for affixing onto the inner wall of the hose, are well known and recognized, wherein water exit "pool" (also known as water outlet basin) is formed on them. Naturally, a water outlet opening that, as said, is formed on its side in the hose's wall, is formed opposite said water exit "pool" and within its boundary, wherein it connects for water flow passage from it to the outer side of the hose and thus enables the exit of the water from the integral drip irrigation emitter to the outside of the hose.

For the sake of clarification, it is specifically noted herein under that using the term 'hose' does not limit in any way whatsoever the thickness of the wall of the hose (pipe) and that integral drip irrigation emitters are installed (implemented) inside hoses having thin walls thickness as well as in hoses with thick walls dimensions, wherein the hoses can be manufactured in varied manufacturing technologies (for example by extrusion of a tubular profile or as a sheet that is folded and rolled to become tubular and then welded as a "seam" all along its length dimension).

Concurrently, in the irrigating by dripping field, an elongated slit (one or more) is known and recognized as a configuration of a water outlet opening that is different for example from drilling a round bore shape opening at the hose's wall.

See for example U.S. Pat. Nos. 3,293,861 and 4,053,109 that describe slits as the exit opening from hoses (hoses in general, not drip irrigation hoses).

From the outset, forming a water outlet opening specifically as a slit and in a directional orientation with the length-wise dimension of the hose, facilitates to exploit the possibility to integrate the necessary stage of forming the water outlet opening, in a continuous (sequential) production process in which the hose is in motion all the time, and compare—the simplicity of the timed lowering of a slit-cutting blade into the non-stopping continuous movement of the hose, as opposed to the complexity of the necessity to propel drilling means to the hose's side, concurrently with the endless movement of the hose and in synchronization with the non-stopping advancing movement of the hose until completing the drilling of a round opening type of an outlet opening.

See for example patent IL 105,745 wherein there was displayed a means for creating outlet openings from a drip irrigation hose of the "tape" type (different from drip irrigation hose in which discrete drip irrigation units are integrated), in a configuration of a knife that is lowered from time to time onto the flow of the hose (and naturally produces a slit as a water outlet opening from it)—see there FIGS. 19-21.

To continue and in referring to drip irrigation hoses of the "tape" type, to which it is actually referred as of a continuous strip of drip irrigation emitters that is affixed to the wall of the hose or formed as an integral part of it, a possibility of forming water outlet openings was described wherein the water exits are exactly thin slits (while avoiding as much as possible extracting material from the hose wall in the process).

See for example U.S. Pat. Nos. 5,522,551 and 5,865,377 that described a thin and long slit, with the capability of self-opening and self-closing as the water outlet opening from drip irrigation hoses of the "tape" type (as differentiated from an integral drip irrigation hose in which discrete drip irrigation emitters are integrated).

Professionals have learned that forming the water outlet as a thin and elongated slit might contribute to decreasing the phenomena of clogging the water exit openings that result from penetration of earth lumps, dirt, contamination or roots (that naturally are pulled towards the water outlet openings from the hose and grow towards them). Integral drip irrigation hoses can be buried in the ground (for ensuring fast wetting and to prevent their movement in high winds). Embedding the hoses in the ground is liable to worsen the clogging problem when the water pressure in the hose is reduced. It causes suction inwards phenomena of foreign objects (soil and the like). Hence, forming the water outlet opening at the wall of the hose, in the configuration of an elongated very thin slit, in accordance with the hose wall thickness, may lead to the result that when the water pressure decreases the slit would "close itself" in a manner that can prevent penetration of foreign objects at the time the suction phenomenon starts.

Thus it has been known to form the water outlet opening in the configuration of a thin and extended slit, but this configuration has been implementable only in drip irrigation hoses of the "tape" type whose wall was relatively thin and wherein the configuration of the water pressure reduction mechanism (for example—as an elongated continuous strip of drip irrigation emitters), enables—in geometrical terms, to allocate a substantial length as required, for the slit formation.

However, when we consider an integral, discrete drip irrigation emitters, that are formed, each one of them, with a water exit "pool", we will find that from the outset the length dimension of the exit "pool" limits the possibility to implement at the wall of the hose, a slit that would be at appropriate length given the length dimension of the pool. Hence, the professionals were required to challenge forming an integral discrete drip irrigation emitters with a relatively long exit pool (such a drip irrigation emitter constitutes the subject matter of patent application PCT/IL2012/050115 of the applicant of this current patent application).

Moreover, from the instant of affixing the circumferential rim of the "walls of the pool" of the discrete drip irrigation emitter to the internal wall of the hose (for example—in a way of inserting the drip irrigation emitter into the hose, during the continuous process of manufacturing the hose by extrusion, and affixing it to the still hot hose being extruded, by heat soldering), the drip irrigation emitter body which is relatively rigid, actually insulates the hose's wall sector that is framed and delineated by the circumferential rim of the "walls of the pool".

Framing and delineating the sector of the circumferential rim of the wall of the hose that is positioned facing the exit "pool", is found to actually neutralize the influence of the increase of the water pressure in the hose for that relevant sector. Namely, it was found that increase or decrease of the water pressure prevailing in the hose, does not any longer cause an elastic deformation in the hose wall sector that is framed and delineated by the circumferential rim of the "walls of the pool".

Thus, until the invention that is the subject matter of this application, professionals in this field that wanted to obtain the advantages inherent in the elongated slit as the water outlet opening, which we pointed above, and this—also in the configuration of a drip irrigation hose in which there are installed integral, discrete drip irrigation emitters, found that from the instant that they affixed integral drippers with an exit "pool" to the thin wall of the hose, they actually neutralize the elastic properties of the thin wall of the hose, which they need for obtaining the same advantages.

Affixing the circumferential rim of the "walls of the pool" in an integral drip irrigation emitter that is relatively rigid onto the wall of the hose, actually neutralized the hose sector that is found framed and delineated by the same walls, from the influence of the increase or decrease in the water pressure in the hose. The radial forces on the wall of the hose, which were activated by the increase of the water pressure, were not "translated" for the task as properly required, to pulling the hose wall sector that is framed and delineated by the circumferential rim of the water exit "pool" on its two sides.

Not withstanding, and to differentiate from the elastic swelling (becoming inflated) and flattening of the hose profile in accordance with the increase and decrease of the water pressure in it, as was carried out due to the soft raw material from which the hose is commonly manufactured (for example, polyethylene) and its relatively thin wall thickness, the relatively rigid construction of the integral (discrete) drip irrigation emitters (that are commonly manufactured by injection of a relatively rigid polymer), absorbed the strain without resulting in the required elastic deformation due to puling the wall of the hose sector that is framed and delineated by the circumferential rim of the water exit "pool" on its two sides.

For clarifying, reference is being made to FIG. 1. The figure includes two pairs of schematic drawings that present the failure of the slit mechanism from the instant of affixing integral drip irrigation emitters and framing and delineating a sector of the walls of the hose opposite the exit "pool" of the drip irrigation emitter.

The first pair (1a) represents by a cross section, a hose 10 (without drip irrigation emitters) wherein in its wall there was formed a water outlet opening in a thin slit configuration 20. From the instant of water pressure dropping in the hose, the hose is flattened and the opening of the slit is closed. upon rise of the water pressure in the hose (P), radial forces are exerted on the inner wall of the hose (marked by arrows) that cause the swelling (inflating) of the hose and due to it also creating a local inflating in the area in which the slit 20 is formed, and as a result—to the opening of the slit for water passage outwards (see the opening width dimension of the slit that was marked W).

The second pair (1b) depicts by a cross section, a hose 30 with a "boat" like integral drip irrigation emitter 40 affixed to its inner wall. Drip irrigation emitter 40 is formed with a water exit "pool" 50 on its surface area that is turned towards the wall of the hose, in such a manner that it instills to the cross-section of the drip irrigation emitter a characteristic appearance as the letter U (wherein its "legs" 52 and 54 are formed at their ends with a rim that constitutes a part of a circumferential rim 57 of the water exit "pool" 50 and "legs" 52 and 54 are linked by what constitutes the "bottom" 59 of the water exit "pool" 50). From the instant of integrating the drip irrigation emitter inside the hose (as shown in the figure), the edge of the circumferential rim 57 of water exit "pool" 50 is affixed to the inner wall of hose 30. From the instant of affixing circumferential rim 57 (for example—by heat soldering while manufacturing the hose by extrusion), it frames and delineates a sector of the wall of the hose (see the width dimension of the sector that was numbered 60). As control of the opening and closing of the water outlet opening in accordance with the pressure that prevails in the hose is required (while exploiting the elasticity characteristic of the material of the hose), there is implemented a water outlet opening in the configuration of a thin slit 70. In this case too, with the increase of the water pressure in the hose (P), there are exerted radial forces on the inner wall (marked by arrows) that cause the swelling (inflating) of the hose, but the relatively rigid profile, in the shape of the letter U of the drip irrigation emitter 40 absorbs the strain without resulting in providing elastic movement of pulling the wall sector of the hose, that is framed and delineated by circumferential rim 57 of the water exit "pool", in its width dimension 60 on its two sides. Therefore, slit 70 remains closed as it was.

In this situation, at most, inside the water exit "pool" and under the sector of the wall of the hose that is framed and delineated by the circumferential rim of the "walls of the pool", drops of water are accumulated—in which there prevails approximately the atmospheric pressure (as an outcome of passage of water through the water pressure reducing mechanism in the drip irrigation emitter). Such an accumulation of drops, is not enough to expose the sector of the wall of the hose for a strain that would lead as required to an elastic deformation of "opening" the slit for a passage of water, namely dynamically and in correlation with the increase of the water pressure in the hose and to "closing" the slit for water passage from the instant of decreasing water pressure in the hose (and at most there will be a trickling of water through the slit opening).

Indeed, it is feasible to design a slit that would open a little from the instance of accumulation of a sufficient water pressure in the exit "pool", but in such a scenario the varying differential pressure prevailing between the "pool" and beyond the wall of the hose—in the environment, constitutes an additional resistance (accumulating in series) to that that was posted by the pressure reducing means (for example—the labyrinth) in the drip emitter. The flow rate from the dripper would hence be dependent also on the resistance to the flow presented by the slit (a resistance that can vary in accordance with, for example, the thickness of the wall of the hose, environmental temperature and so on), and this creates difficulties in achieving accurate design (planning), (for example, would necessitates increasing the minimal working pressure of the drip emitter or would mandate forming a relatively long slit).

U.S. Pat. No. 7,681,805 describes forming water exit openings in a configuration of slits in an integral drip irrigation hose in which there are integrated discrete drip irrigation emitters. A publication of patent application WO 2011051936 describes forming a shaped water outlet in a drip irrigation conduit in which there are integrated discrete drip irrigation emitters. But, as said, in the cited publications, there is not described any means what so ever that enables dynamically opening a slit to water passage through it, and hence the conclusion, by straightforward logic, is that actually the prevailing water pressure in the water exit pool (namely—atmospheric pressure), is the only means for opening of the water outlet, or in other words—these publications depict a water exit opening that is not dynamic (i.e., an opening that does not behave according to and in correlation with the water pressure that prevails in the hose).

U.S. Pat. No. 7,175,113 describes an integral drip irrigation hose with control capability over the exit openings from it in accordance with the prevailing water pressure in it, but what is treated there are configurations of "a kind of" unidirectional valves with clearly a complex construction. Thus for example, in one configuration (see there, FIGS. 19 and 19a to 19e), a bi-component construction, made of two different materials and a complicated angular geometry of the water passage is described. In a second configuration (see FIGS. 20 and 20a to 20c), once again—a rather complicated bi-components construction made from two different materials and providing the opening area with a slack addition that enables local swelling (inflating) of the hose is described.

Furthermore, the functioning of the unidirectional valves mechanisms that are described there, depend on the wall thickness of the specific hose, and hence requires compatibility and design anew in accordance with the wall thickness of the hose. Moreover, a bi-components structure is deemed to be relatively expensive, limited by the variety of materials that can be used (selected) (the two materials have to be suited to co-extrusion manufacturing process), and the elastomeric component might be harmed by creep during long service and also due to temperature variations.

As per these circumstances, in the time that preceded the current invention, a need for integral, discrete, drip irrigation emitters with an exit "pool" formed on them existed, that would enable in a simple and relatively low priced manner, utilizing a water outlet opening on the wall of the hose into which they are integrated, that would be not only formed as a slit relatively long and thin, but also provide for dynamic "opening" and "self closing" capabilities, in accordance with the water pressure prevailing in the hose and in correlation to it.

SUMMARY OF THE INVENTION

The current invention responds to the need expressed above by providing an integral, discrete drip irrigation emitter that is adapted to being integrally installed inside a hose, and wherein in one preferred embodiment and just like most such known drip irrigation emitters, comprises also an essentially rectangular ("boat" like) body component wherein on its one side it is formed with an exit "pool" having a circumferential rim that is suited for affixing onto the inner wall of the hose and in a manner that a characteristic cross section of this drip irrigation emitter in the area of the exit pool resembles the configuration of the letter U (where the ends of its "legs" constitute a part of the circumferential rim of the exit "pool", and its "legs" are linked through the "bottom" of the exit "pool").

A prominent characteristic (feature) of an integral, discrete drip irrigation emitter in accordance with the invention is forming the drip emitter with means for facilitating the spreading of the "legs" of the U configuration, so that after affixing the drip emitter onto the inner wall surface of the hose, and from the instant that the water pressure in the hose rises, an elastic movement of the sector of the hose's wall that is framed and delineated—as a consequence of affixing the circumferential rim of the exit pool onto the inner wall of the hose, will take place onto opening a slit that was formed in the sector as a water outlet opening, and from the time the water pressure in the hose decreases, a closing of the slit would occur.

In other words, the point of novelty of the invention which is the subject matter of the present invention, is found in the implementation of means for facilitating the spreading of the U's configuration "legs" that characterize the appearance of a "boat" like, integral, discrete, drip irrigation emitter in its cross section region of the water exit "pool" from the drip irrigation emitter, in order to enable operating the function of self opening and self closing of the water outlet opening that is formed in the hose wall opposite the water exit "pool", and this in correlation to the increase (opening) and decrease (closing) of the water pressure in the hose, and wherein the water outlet opening is formed as a thin slit (one or more) in the sector of the hose that was framed and delineated by the circumferential rim of the exit pool, from the instant of affixing the emitter's body to the hose internal wall.

For clarifications, reference is being made to FIG. 2 (and compare to FIG. 1 and the explanations given above, in the "Background of the Invention" chapter). The figure includes a pair of schematic drawings that present the operation of the slit mechanism from the instant of affixing the integral drip irrigation emitter in accordance with the invention and thus, framing and delineating a sector of the wall of the hose opposite the exit "pool" of this innovative drip irrigation emitter.

The first drawing presents by a cross section, a hose 230 with a "boat" like drip irrigation emitter 240 in accordance with the invention, affixed to its inner wall. Drip irrigation emitter 240 is formed with a water exit "pool" 250 on its surface area that is turned towards the wall of the hose in a manner that instills to the cross section of the emitter a characteristic appearance that resembles the letter U (wherein its "legs" 252 and 254 are formed on their ends with a rim that constitute part of circumferential rim 257 of the exit "pool" 250, and "legs" 252, 254 are linked through what constitutes the "bottom" 259 of exit "pool" 250). Similarly to the integral drip irrigation hose that is illustrated in FIG. 1, also in the integral drip irrigation hose 230 in which there are installed drip irrigation emitters in accordance with the invention, from the instant of integrating the drip emitters inside the hose, the edge of circumferential rim 257 of exit "pool" 250 is affixed to the internal wall of hose 230. From the instant of affixing the circumferential rim (for example by heat soldering while manufacturing the hose by extrusion), it now frames and delineates a sector of the wall of the hose (see the width dimension of the sector numbered 260).

Let's turn to the second drawing found in FIG. 2. As dynamic control of the opening and closing of the water outlet opening from the hose is required, in accordance with the water pressure that prevails in it (while exploiting the elastic properties of the material of the hose), an opening is implemented in the hose wall in a configuration of a thin, long slit 270. Here, as well as before, with the rise of the water pressure in the hose (P), radial forces are exerted on the inner wall of the hose (marked by arrows) that cause inflation (swelling) of the hose, but—

In contradiction to earlier knowledge relating to a drip irrigation emitter (as described when referring to FIG. 1 and as cited above in the "Background of the invention" chapter), the profile similar to the shape of the letter U of drip irrigation emitter 240 enables spreading "legs" 252 and 254 in a manner that leads to an elastic movement of pulling the sector of the hose sector that was framed and delineated by the circumferential rim of the water exit "pool" in its width dimension 260, on its two sides, in a manner that causes the opening of slit 270 for water passage outwards through it (see the slit opening width that was marked W).

In a drip emitter in accordance with the invention, the means for facilitating "spreading" the "legs" of the U configured profile and achieving the function of self opening and closing of the water outlet slit, might be a cavity, one or more, whose forming in the body of the drip emitter causes a reduction of the inertia moment of the area (known as second moment of area, second moment of inertia, area moment of inertia) in the U shaped cross section, in a manner that upon the increase of water pressure in the hose and loading the drip emitter with forces, the development of stresses in the U shaped cross section, would lead to an elastic movement of the legs of the U configuration (and thus, to pulling above cited sector of the hose's wall, that was framed and delineated by the circumferential rim of the water exit "pool", in its width dimension, on its two sides, in a manner that would cause the opening of the slit for passage of the water outwards).

In one embodiment of a drip emitter in accordance with the invention, the means for facilitating "spreading" the legs of the U configured cross section and achieving the function of self opening and self closing of the water outlet slit, is an array of cavities that comprise a slit formed on the side of the drip emitter that from the instant of affixing it to the hose, is turned towards the inside of the hose, wherein the slit extends along at least a substantial part of the body of the drip emitter, and included in it, at least under the bottom of the drip emitter exit "pool", and a pair of additional slits that are formed in the bottom of the drip emitter exit "pool", wherein they extend on its two sides along at least a substantial part of the exit "pool" length.

In others and different embodiments of a drip emitter in accordance with the invention, the means for facilitating "spreading" the "legs" of the U configured profile and achieving the function of self opening and self closing of the water outlet slit, can be (in combination with a cavity, one or more, as we have pointed above, or by itself), the manufacturing of the drip emitter from a relatively soft raw material, for example—low density polyethylene (LDPE), in a manner, that as said, upon increase of the water pressure in the hose and the loading of the drip emitter with forces, development of stresses in the U shaped cross-section would lead to elastic movement of the "legs" of the U configured profile.

In another and additional aspect of the present invention, it is embodied in an integral drip irrigation hose in which there is integrated at least one integral, discrete drip irrigation emitter, as was summarized above.

In yet another and additional aspect of the present invention, it is also embodied in a general method for opening and closing a water outlet opening from an integral drip irrigation hose in which there is integrated at least one integral, discrete drip irrigation emitter, in a dynamic manner and in accordance with and in correlation to the water pressure that prevails in the hose.

It is to be understood that both the foregoing general description and the following detailed description are exemplary and explanatory and are intended to provide further explanations of the invention as claimed.

BRIEF DESCRIPTION OF THE ACCOMPANYING FIGURES

Examples illustrative of embodiments of the invention are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale.

FIG. 1 constitutes as said, two pairs of schematic drawings (1a and 1b) that present the failure of the slit mechanism from the instant of affixing integral drip emitters and framing and delineating a sector of the wall of the hose opposite the water exit "pool" of the drip irrigation emitter.

Figure 1:
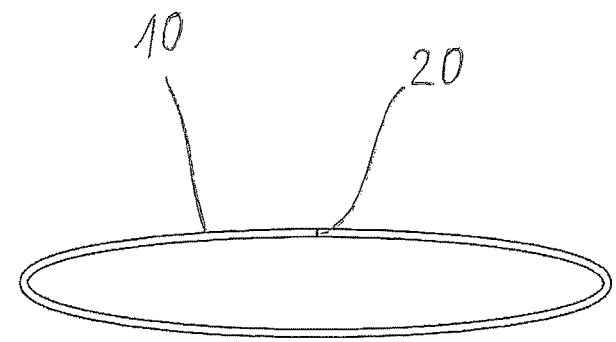
Figure 1:
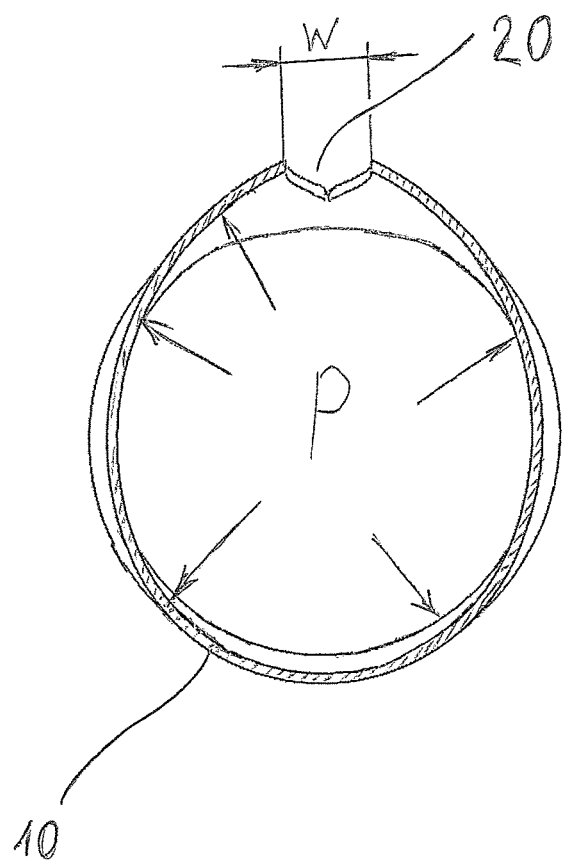
Figure 1:
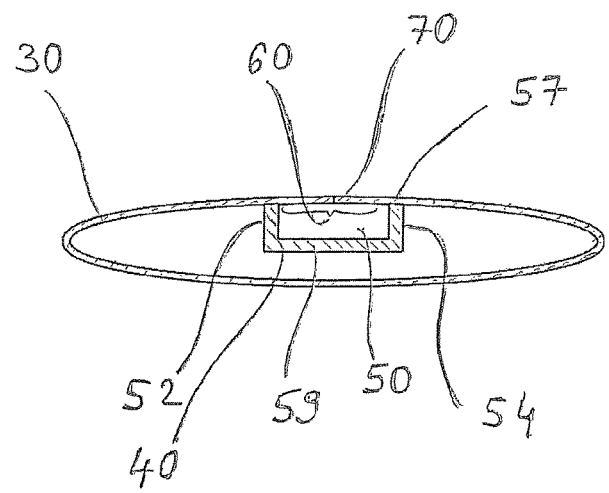
Figure 1:
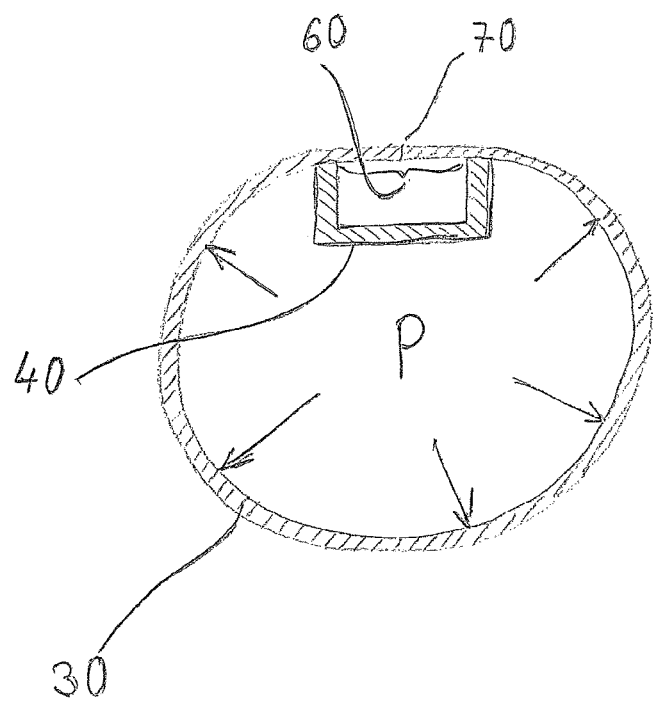
Figure 2:
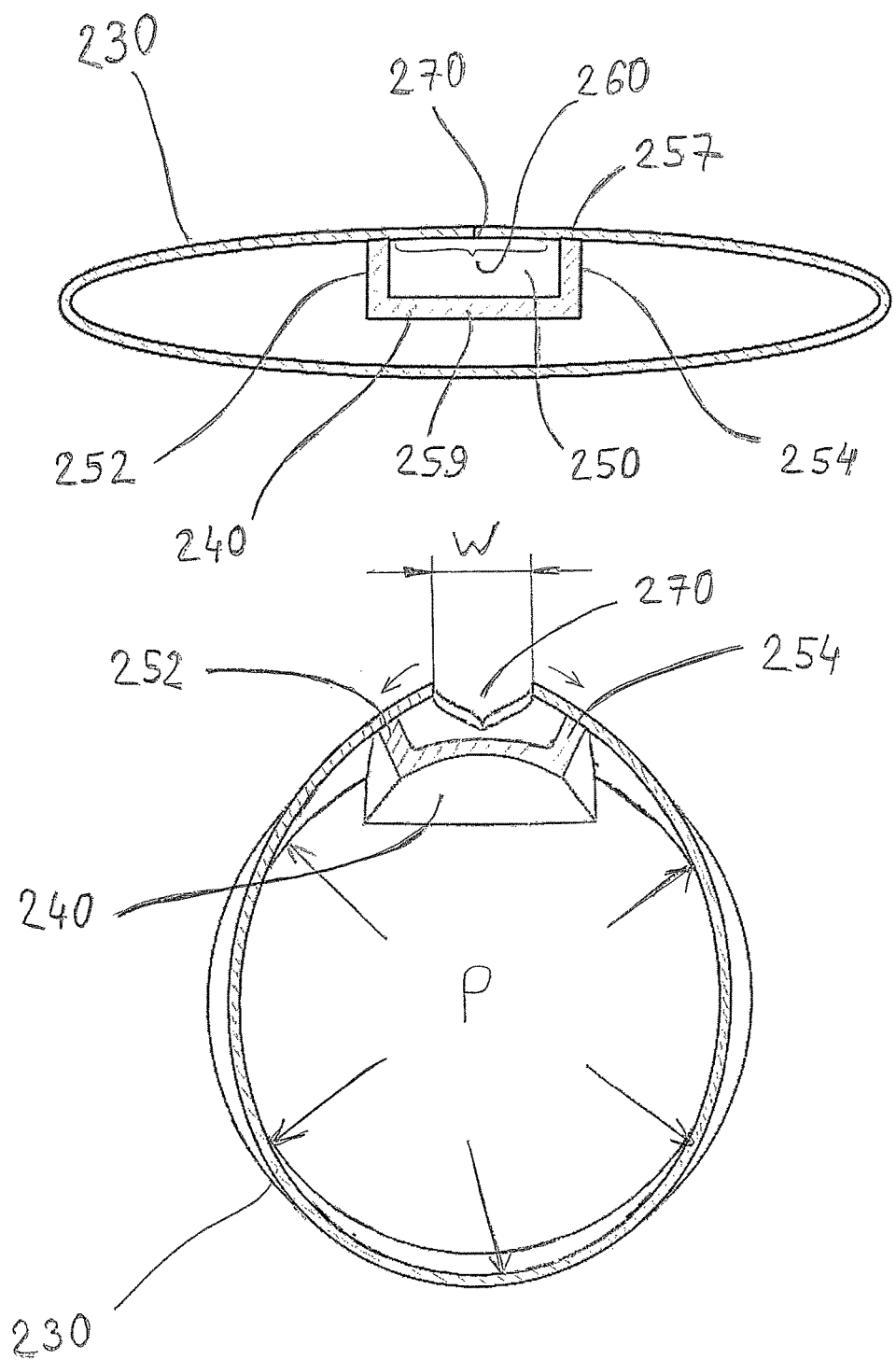
FIG. 2 is, as said, a pair of schematic drawings that present the operation of the slit mechanism from the instant of affixing integral drip irrigation emitters that are in accordance with the invention and framing and delineating a sector of the wall of the hose opposite the exit "pool" of such a drip irrigation emitter that is in accordance with the invention.
Figure 3:
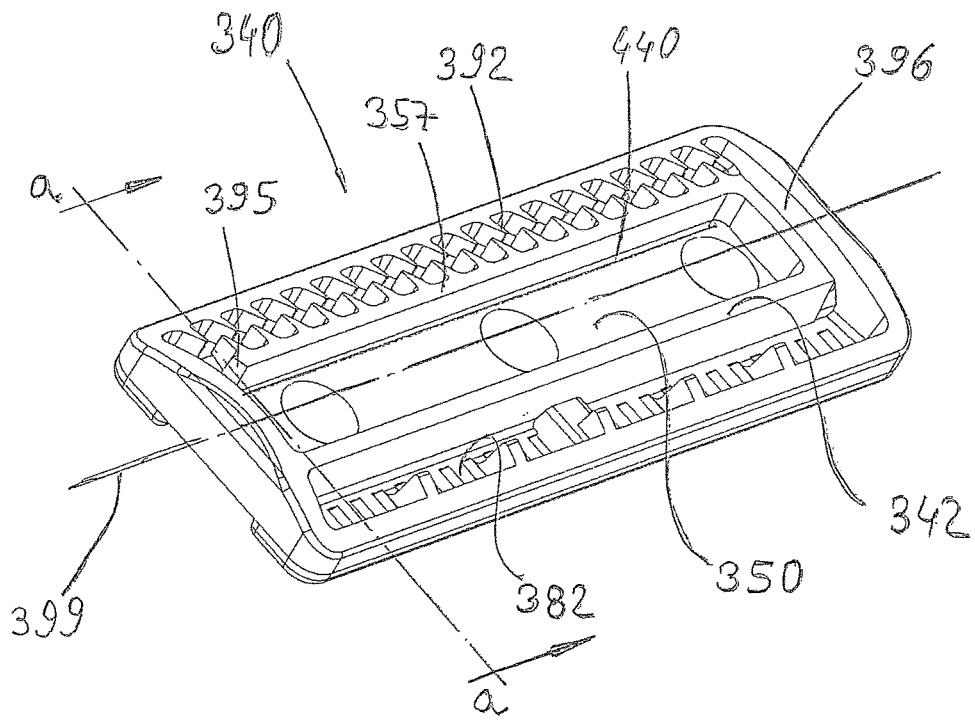
FIG. 3 is a view in perspective of an example of a drip emitter in accordance with the invention.
Figure 5:
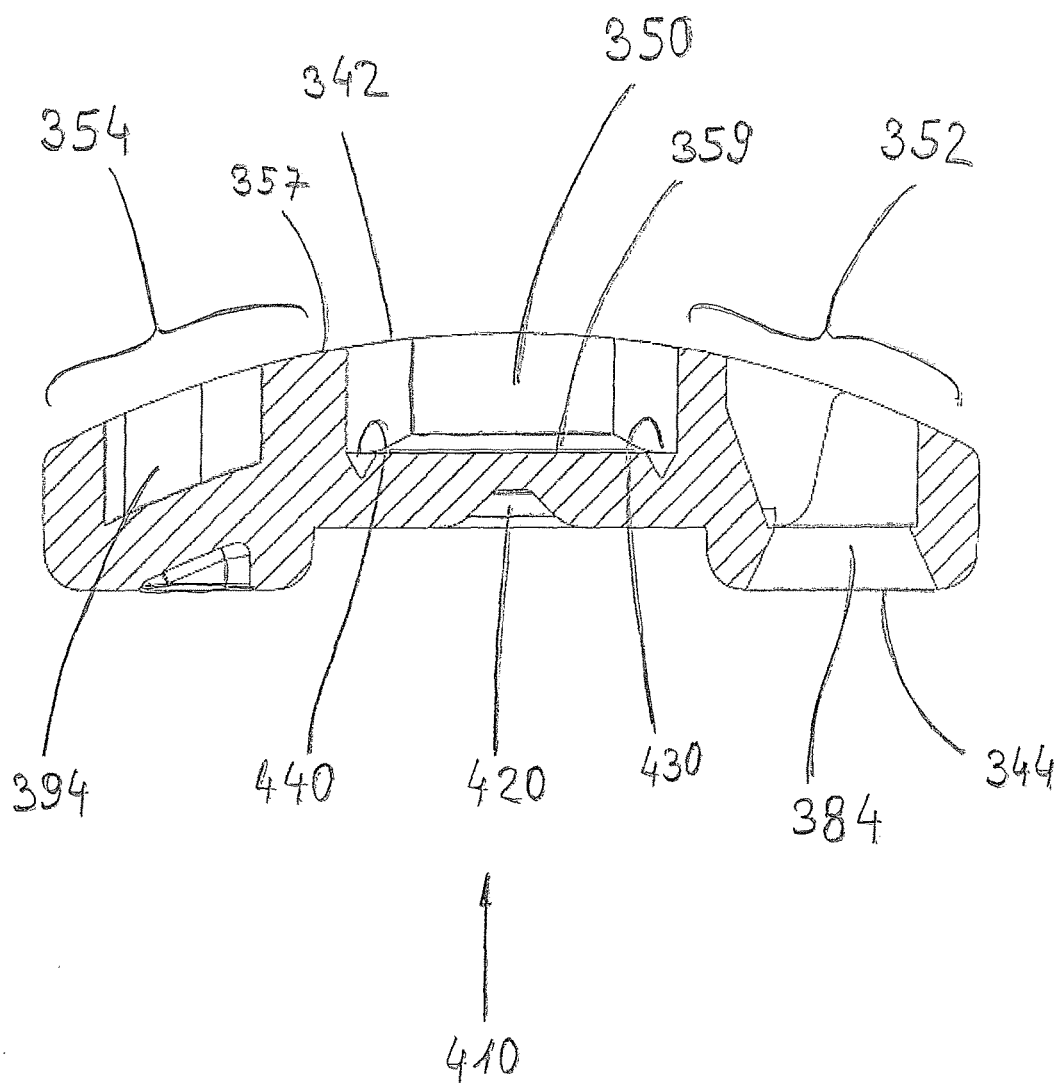

FIG. 5 constitutes a side view of cross section a-a that was marked in FIG. 3.

Figure 4:
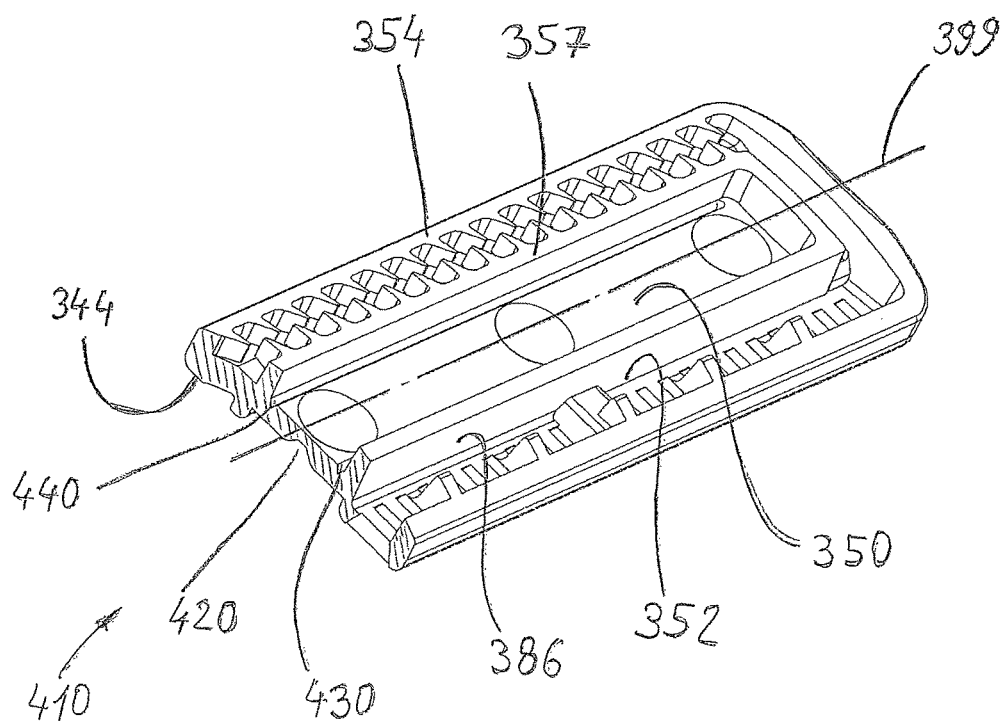
FIG. 4 is a view in perspective of cross section a-a that was marked in FIG. 3.
Figure 6:
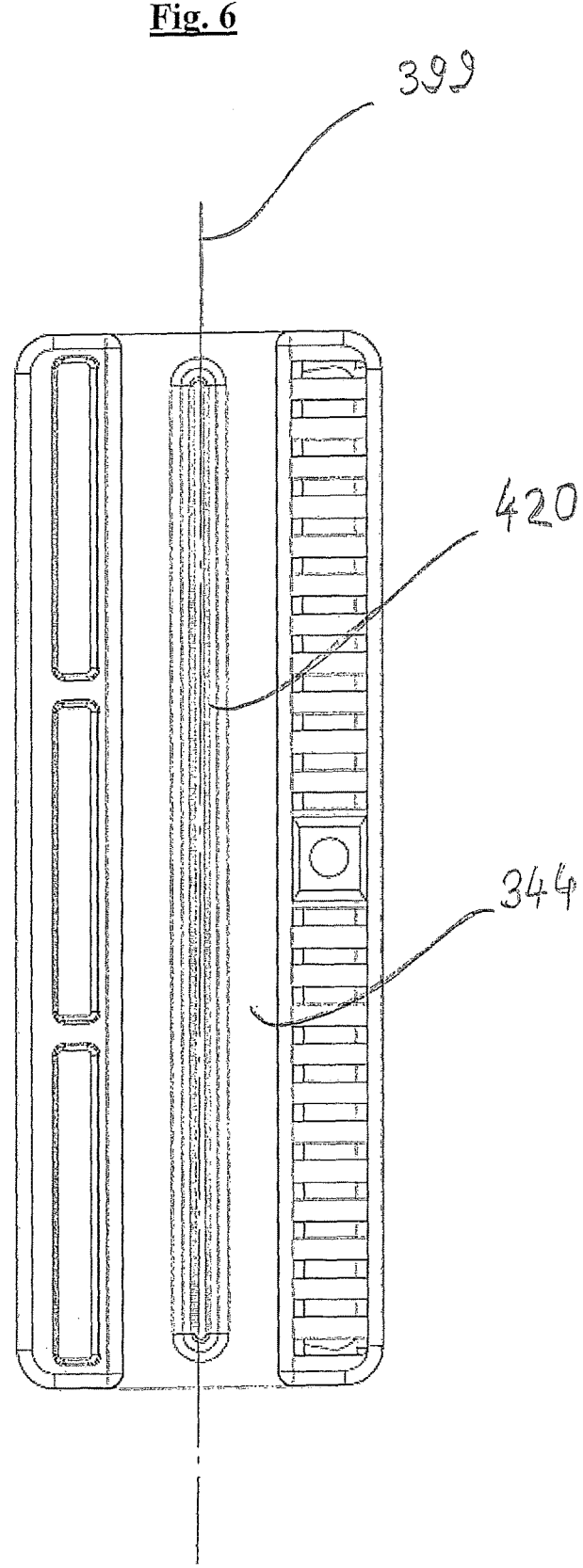

FIG. 6 depicts a view of the drip irrigation emitter that is illustrated in FIGS. 3, 4 and 5, of its side that from the instant of being affixed to the hose, is turned towards the inside of the hose.

Figure 7:
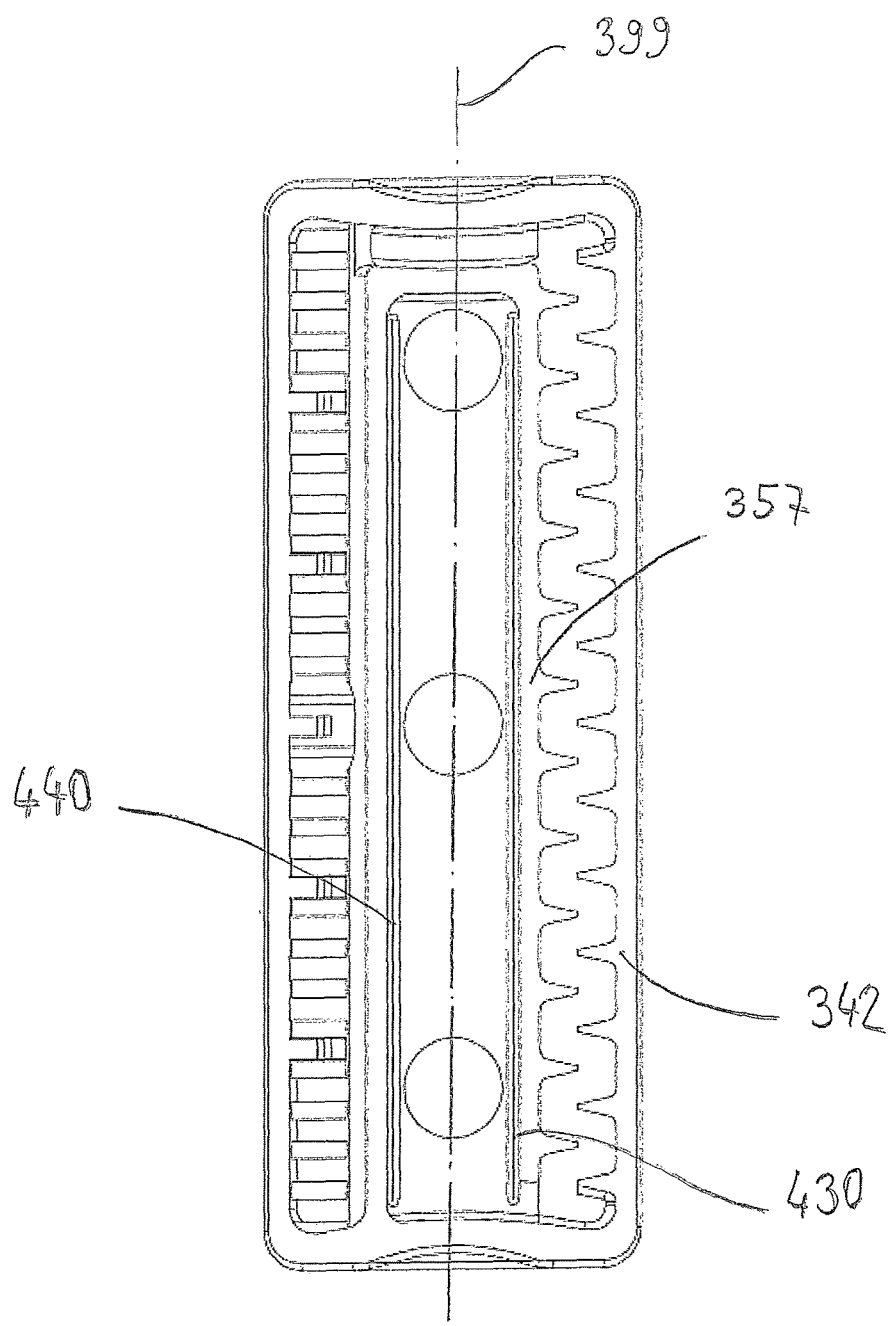

FIG. 7 depicts a view of the drip irrigation emitter that is illustrated in FIGS. 3, 4, 5 and 6, of its side that is adapted for affixing onto the inner wall of the hose.

Figure 8:
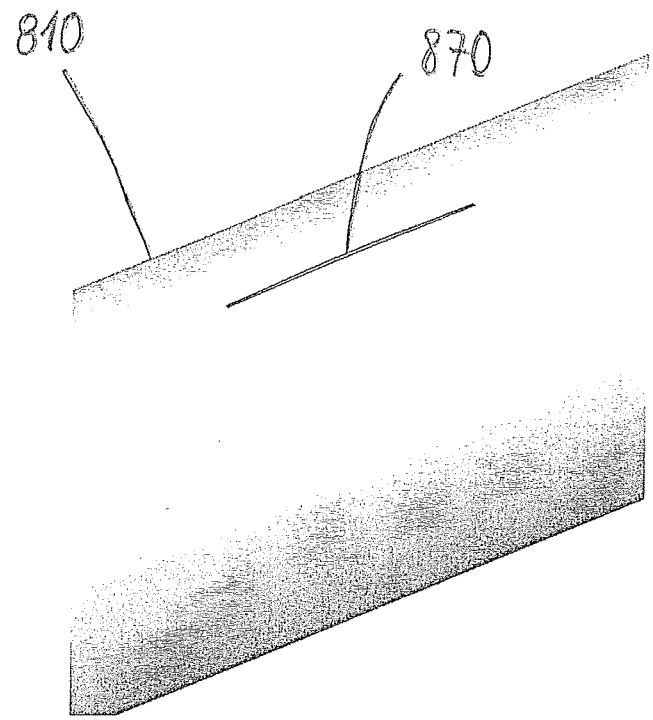
Figure 9:
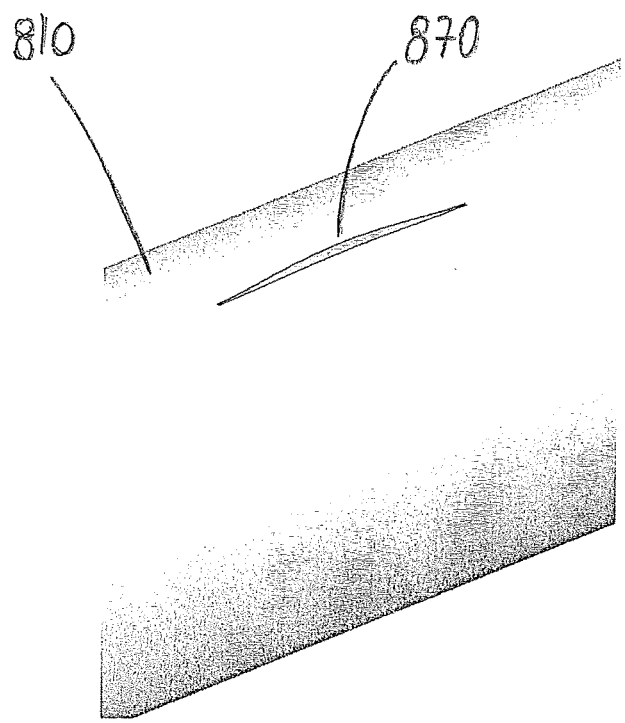
Figure 10:
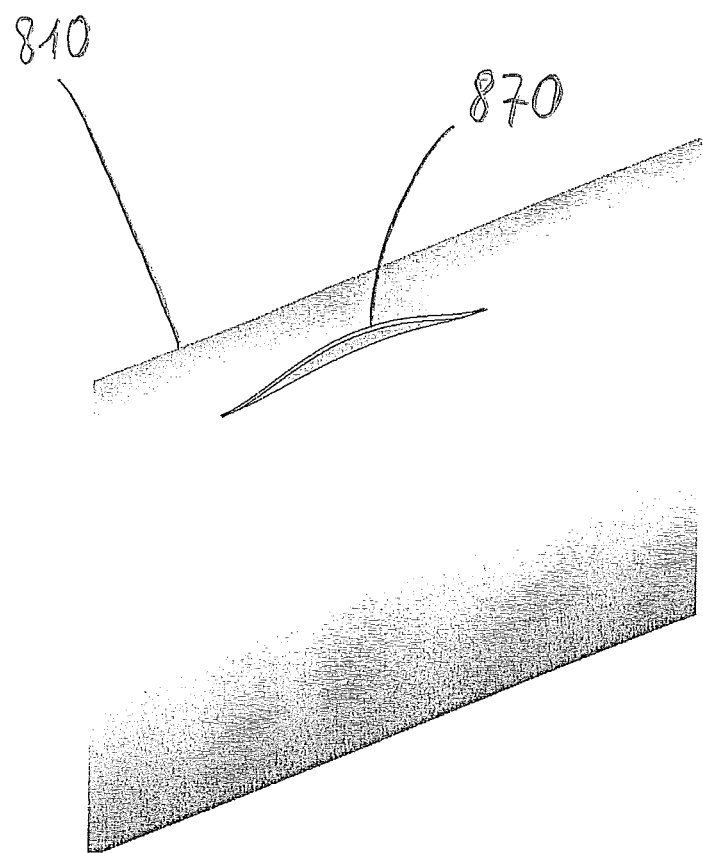

FIGS. 8, 9 and 10 depict a sequence of drawings in perspective, of a sector of an integral drip irrigation hose wherein there was embedded a drip emitter in accordance with the invention, and in it was implemented a water outlet opening in a slit configuration, that demonstrates the opening of the slit from the instant of increasing water pressure in the hose, and the spreading of the side walls of the water exit "pool" as a consequence of this.

Figure 11:
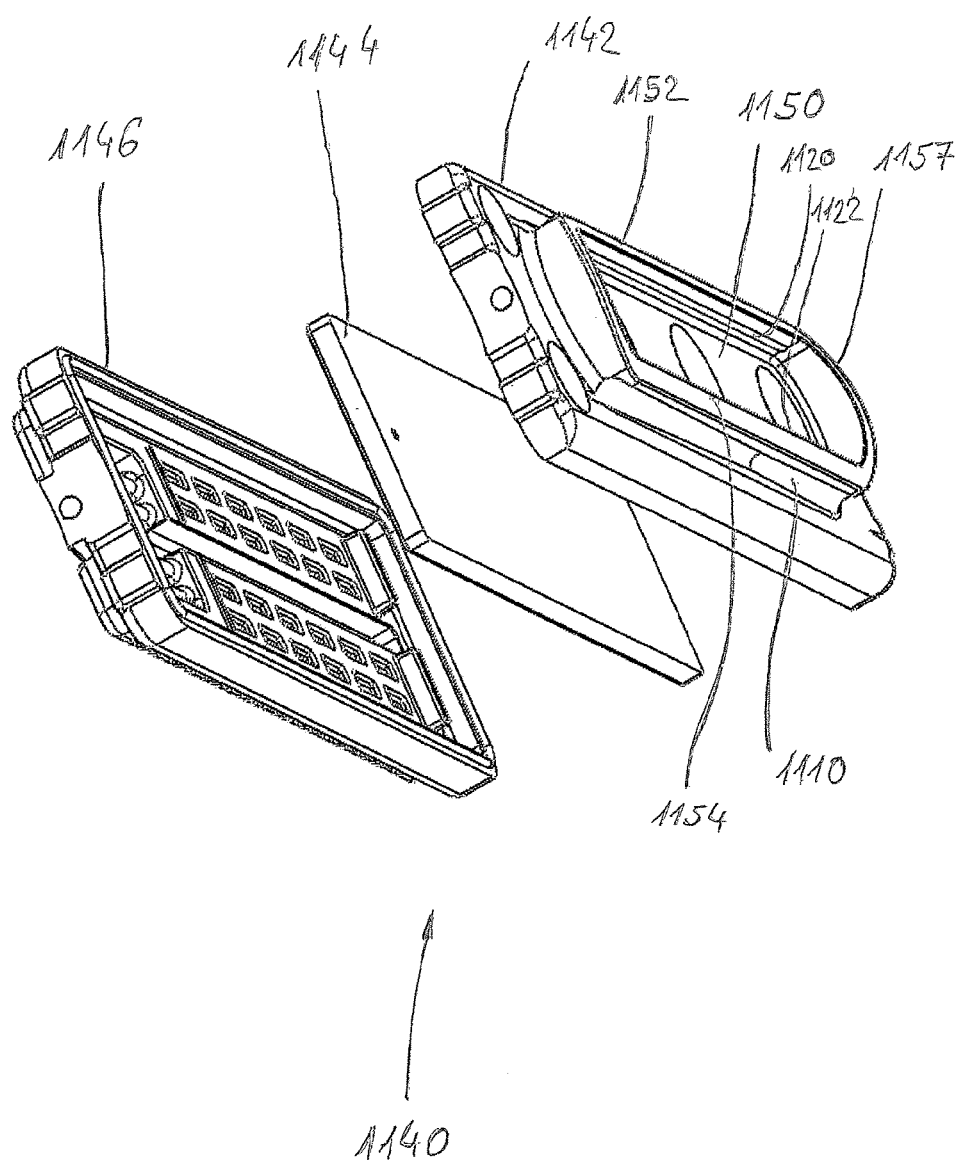

FIG. 11 is an "exploded" view, depicting the elements of an example of a regulated drip emitter in accordance with the invention.

Figure 12:
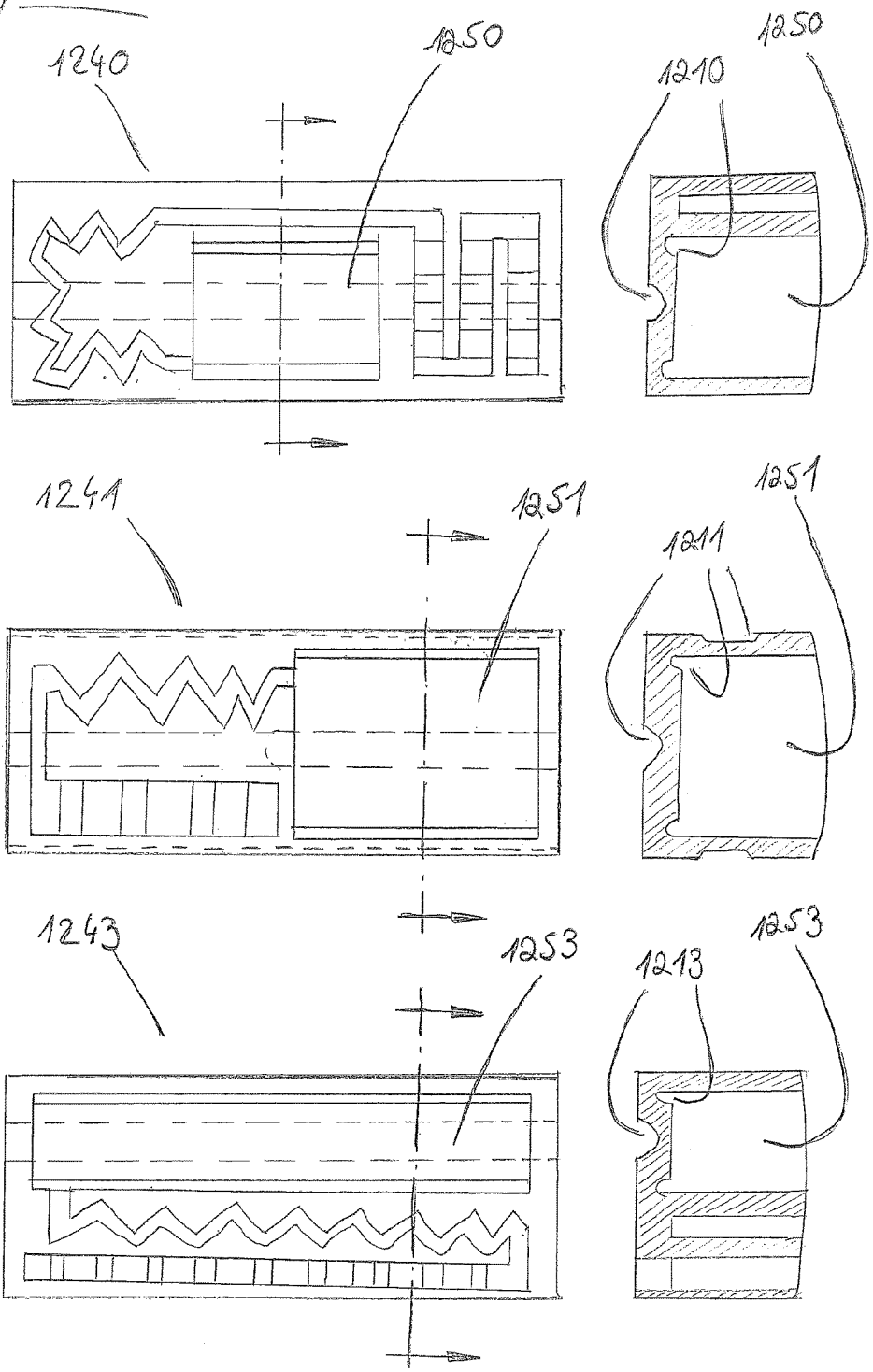

FIG. 12 schematically depicts a variety of non-regulated, non-symmetrical drip emitters in accordance with the invention.

DETAILED DESCRIPTION OF A PREFERRED EMBODIMENT

Reference is being made to FIGS. 3 to 7. FIG. 3 constitutes a view in perspective of an example of a drip emitter 340 in accordance with the invention. FIG. 4 constitutes a view in perspective of cross section a-a that was marked in FIG. 3. FIG. 5. constitutes a side view of the cross section a-a that was marked in FIG. 3. FIG. 6 shows a view in perspective of drip irrigation emitter 340 on its side that is adapted for affixing onto the inner wall of the hose (that is not illustrated). FIG. 7 depicts a view of drip irrigation emitter 340 on its side that is adapted for affixing onto the inner wall of the hose (that is not illustrated).

On seeing the figures, any professional would understand that drip irrigation emitter 340 is a "boat" like discrete drip irrigation emitter of the kind that is adapted to being integrally installed within a hose (that is not illustrated). The drip emitter is a single component device, wherein its body component has an essentially rectangular configuration that on its one side 342 that is suited for affixing onto the inner wall of the hose, it is formed with an exit "pool" 350 in a manner that it instills to the cross section of the drip emitter (see FIG. 4) a characteristic appearance that resembles the letter U, wherein its "legs" 352 and 354 are formed at their ends with an edge that constitutes a part of circumferential rim 357 of exit "pool" 350 that is suited to be affixed onto the inner wall of the hose, and these legs are linked through the bottom 359 of exit "pool" 350.

In drip emitter 340, and let it be emphasized that the discussed subject matter is only an example, the body component, on its one side 342 that is suited to be affixed to the inner wall of the hose, there is also formed filtering means 382 (in the illustrated example—in a configuration of an array of slits 384 that provide for a water flow passage through them arriving from the second side of the body component, and a routing channel 386 that extends along all the length and parallel to the water exit "pool" 350 for routing the flow of the already filtered water), and with water pressure reducing means 392 (in the illustrated example—by an array of baffles resembling a labyrinth 394). Water passage 396 connects for flow of filtered water from said filtering array 382 onto one end of water pressure reducing means 392. Water exit 395 connects for filtered water flow passage, whose pressure was already reduced, from the second end of the water pressure reducing means 392 to the exit "pool" 350.

In drip emitter 340, and let it be emphasized again that the discussed subject matter is only an example, exit "pool" 350 is formed wherein it is extended in its dimensions and extends substantially along the entire length of the body component, wherein on its one side, along its entire length and parallel to it, filtering means 382 extends and constitutes a part of one leg of the U resembling configuration in cross section (see FIG. 4—filtering means 382 formed inside leg 352). On the other side of exit "pool" 350, also along its entire length and parallel to it, water pressure reducing means 392 extends and constitutes a part of the second leg of the U resembling configuration in cross section (see FIG. 4—water pressure reducing means 392 formed inside leg 354).

Flow passage 396 is formed wherein it extends on one side of the body component and on its width, and water exit 395 is formed on the other end of the body component.

In drip emitter 340, and let it be emphasized again that the discussed is only an example, the forming of exit "pool" 350, wherein it is extended in its dimensions and substantially extends along the entire length of the body component, defines a length axis 399 wherein filtering means 382 and water pressure reducing means 392 are formed in a symmetrical manner relevant to it.

In accordance with the invention, drip emitter 340 includes means 410 for facilitating the spreading of the legs of the configured U resembling exit "pool" 350, so that after affixing the drip emitter to the internal wall of the hose, and upon increasing the water pressure in the hose, an elastic movement of the sector of the hose that is framed and delineated as a consequence of affixing the circumferential rim 357 of exit "pool" 350 to the internal wall of the hose, would start. The elastic movement will cause the opening of a slit that was formed in this sector (that is not illustrated), as a water outlet opening, and from the instant the water pressure in the hose decreases—there would occur the closing of the slit.

In drip emitter 340 and let it be emphasized again that the discussed subject matter is only an example, means 410 for facilitating the spreading of the legs of the configured U of the exit "pool", is an array of cavities that comprise (see FIGS. 4, 5 and 6), slit 420 that is formed on side 344 of the drip emitter that from the instant of affixing it onto the hose, is turned toward the inside of the hose (that is not illustrated). Slit 420 extends along at least a substantial part of the body component, and including in it at least under the bottom 359 of exit "pool" 350.

In addition, in drip emitter 340, means 410 for facilitating the spreading of the legs of the configured U of the exit "pool", comprise also (see FIGS. 4, 5 and 7), a pair of slits 430 and 440, that are formed at the bottom 359 of the drip emitter exit "pool", wherein they extend on the bottom two sides, close to and in parallel in their direction, to the walls of the exit "pool" that constitute the legs of the configured U—352 and 354 respectively, and along at least a substantial part of the length dimension of the exit "pool".

In drip emitter 340 and let it be emphasized that the discussed subject matter is only an example, slit 420 that is formed on the side of the drip emitter that from the instant of affixing it to the hose, facing the inside of the hose (344), extends along the length axis 399 and the pair of slits 430, 440 that are formed at the bottom 350 of the drip emitter exit "pool, are formed in a symmetric manner relative to length axis 399.

Any professional would also appreciate the fact that embodiment of means 410 as was performed in the illustrated example, by forming open cavities in the shape of open slits on the two sides of the body component of the drip emitter, does not complicate the manufacturing process of the body component of the drip emitter that as usual is done by injection molding, and requires only minor changes of existing molds.

In the foundation of the invention resides the understanding as to the behavior of the drip emitter as a structural element that is loaded by forces upon increasing the water pressure in the hose and its relaxation from the instant that the water pressure in the hose decreases. In a typical "boat" like integral, discrete, drip irrigation emitters, exists a configuration resembling a U shaped profile at the width cross section of the exit "pool" region (see for example FIG. 4), wherein the ends of the "legs" of the U are affixed (harnessed) to the internal wall of the hose, and the element is loaded with forces from the instant the water pressure in the hose increases and the water pressure causes swelling (inflation) of the hose's profile. Given the fact that the structural element of the drip emitter body component remains in the elastic domain, then by a variation of the inertia moment of the surface (known as second moment of area, second moment of inertia, area moment of inertia) in the U shaped cross section, it is possible to obtain control on the geometrical extent of the elastic movements and bending of the element's parts under a given load.

Hence, from the configuration that was described above solely as an example, and while referring to FIGS. 1 to 7, any professional would understand and appreciate the fact, that in its general configuration, the point of novelty of the invention is liable to be embodied in means for facilitating "spreading" the "legs" of the U configured profile of the exit "pool", that is not necessarily in the configuration of the three slits 420, 430 and 440 that were described above when referring to drip emitter 340, but rather any means that includes at least one cavity and is formed in the body component of drip emitter causes the decrease of the inertia moment of the area (known as second moment of area, second moment of inertia, area moment of inertia) in the U shaped cross section, in a manner that after affixing the drip emitter onto the inner wall of the hose, and upon an increase in the water pressure in the hose, which expose the drip emitter to forces, the development of the stresses in the U shaped cross section would lead to an elastic "spreading" movement, as said, of the legs of the U shaped configuration, and thus to pulling the sector of the wall of the hose that is framed and delineated by the circumferential rim of the water exit "pool", in its width dimension, on its two sides, in a manner that would cause the opening of the slit for passage of the water outwards.

Similarly, any professional would understand that using the term U configuration, relates only to the region of the exit "pool", and the cross section of the drip emitter in accordance with the invention, also in the same region itself, is liable to include projections that render the cross section to deviate from being a "pure" and precise U shaped configuration (see for example in FIG. 4, on the side 344 of the drip emitter, the bulges on its two sides—on the one side as a part of the filtering means and on the other side as the bottom of the pressure reducing means). In other words—a professional would understand that the invention is implementable and this application contains in its scope also drip emitters whose width cross section in the exit "pool" region deviates from the said "like letter U" shaped form.

Any professional would also understand that describing the legs of the U configured item as they are precisely perpendicular to the bottom of the exit "pool", is done solely as an example, and within the scope of defining the cross section as "U", there can also be included slightly slanted walls relative to the bottom of the "pool".

Furthermore, given the function of facilitating the spreading of the legs of the U shaped configuration of the exit "pool", any professional would understand that the means for achieving it might also be manufacturing the drip emitters from a relatively soft raw material (for example—low density polyethylene (LDPE)), in a manner that, as said, upon increase in the water pressure within the hose and therefore—exposing the drip emitter to forces, development of stresses in the U shaped cross-section would lead to elastic "spreading" movement of the "legs" of the U configured profile.

Similarly, facilitating the spreading of the "legs" of the U configured profile of the exit "pool", can also be materialized by implementing a means that combined the manufacturing of the drip emitters from a relatively soft raw material together with forming it wherein it includes, as said, at least one cavity (for example—three, as the three slits that were describe above when referring to drip emitter 340), that its forming in the body component of the drip emitter results in decreasing the inertia moment of the area (known as second moment of area, second moment of inertia, area moment of inertia) in the U shaped cross section.

Reference is being made to FIGS. 8, 9 and 10. The figures depict a sequence of drawings showing in perspective, a sector of an integral drip irrigation hose 810, in which there was embedded a drip emitter (that is not illustrated) in accordance with the invention, and in there was implemented a water outlet opening 870 in a slit configuration. The figures demonstrates the opening of the slit from the instant in which the water pressure in the hose increases, due to the spreading of the side walls ("legs") of the water exit "pool" as a consequence of this.

Thus, implementing the invention enables manufacturing by injection, low priced and relatively simple, of an integral, discrete, drip irrigation emitters that are formed with water exit "pools" that would enable using a water outlet opening in the wall of the hose in which they are embedded (integrated), that would not only be in a configuration of a long and relatively thin slit, but also having the properties of dynamic self "opening" and self "closing"—in accordance with and correlation to the water pressure prevailing in the hose.

Any professional would appreciate the fact that the dynamic opening—closing mechanism of the water outlet opening in accordance to and in correlation with the water pressure prevailing in the hose, as it is implemented in accordance with the invention, in the structure of the drip emitter proper, enables the implementation of the inventive mechanism in integral drip lines having different wall thicknesses (in contra distinction from mechanisms whose operation is dependent on the hose wall thickness per-se). The inflation of the hose as it might occur already in a relatively low water pressure is that leads, in accordance with the invention, directly, to the operation of the opening/closing mechanism (without being directly dependent on the hose wall thickness or on the elasticity modulus of a specific component). In other words, for the opening/closing the water outlet opening in the hose, the invention does not rely on a gradual building up of a differential pressure between the accumulating water within (inside) the exit "pool" to the environmental pressure prevailing on the outside of the hose.

In the integral drip irrigation hose described above, when referring to FIGS. 8 to 10, the water outlet opening that was formed at the wall of the hose opposite the above cited water exit "pool" and within its boundaries, was in the configuration of a thin and long single slit 870, that extended in its direction parallel to the walls of the water exit "pool" that constitute the legs of the U configuration and was positioned between them. But any professional would understand that the invention is not limited only to implementing, in the context of drip irrigation hoses in which the water outlet opening was formed as a single slit as said, and it can be implemented also in conjunction with water outlet openings that are formed with plurality of slits (for example—a pair of parallel slits) or say having a shaped "flap" type pattern that enables opening as the water pressure in the hose increase, causing spread of the legs of the U configuration, and "self" closing as the water pressure decreases.

Any professional would understand that in accordance with the invention, as a water outlet opening that is formed opposite to the exit "pool" from the drip emitter, might serve any configuration of an opening whose opening/closing would be directly influenced by the elastic deformation of the drip emitter's exit "pool" legs, as this would occur as an outcome of increasing/lowering the water pressure in the hose.

Furthermore, the invention was described above in relation to a discrete and single component drip emitter. Namely, while referring to drip emitters that do not provide for dynamic pressure regulating/compensating (constant flow rate independent of the pressure variation within the hose). But any professional would understand that the invention is implementable also in the context of integral, discrete multi-components drip emitters, like pressure regulated drip emitters that typically comprise at least three components (body and cover components and elastomeric membrane component).

Reference is being made to FIG. 11. FIG. 11 is an exploded view depicting the elements of an example of a regulated drip emitter 1140 in accordance with the invention.

By inspecting the FIG. (11)—any professional would understand that drip emitter 1140 constitutes an integral, discrete, generally rectangular shaped, drip emitter that comprises three components, namely—body component 1142, elastomeric membrane component 1144 and cover component 1146. The components of the (integral) drip emitter are suited to be installed (mounted) one to the other, in a manner that the elastomeric component would be positioned between the body component and the cover component. Any professional would also understand that the discussed subject matter is a drip emitter of the regulated type—the water pressure that prevails in the hose is applied on (a) one side of the elastomeric membrane component wherein the other side of the elastomeric component is exposed to a reduced water pressure, so that regulating operation is enabled by reducing/increasing the dimensions of a water passage within the emitter, in accordance with the differential pressure prevailing on the two sides of the elastomeric component in the region of that water passage (and in a manner that enables a constant water flow rate that is not dependent on the water pressure variations in the hose).

Body component 1142 is formed with an exit "pool" 1150 that has a characteristic appearance of a letter U shaped cross section. The "legs" of the U—1152 and 1154, are formed at their ends with an edge that constitutes a part of circumferential rim 1157. From the instant of embedding drip emitter 1140 inside the hose (that is not illustrated) and affixing it to its inner wall, circumferential rim 1157 is affixed to the internal wall of the hose and delineates the sector of the hose in which the water outlet opening is formed.

In accordance with the invention, drip emitter 1140 includes means 1110 for facilitating the spreading of the legs of the configured U resembling exit "pool" 1150, so that after affixing the drip emitter to the internal wall of the hose, and upon increasing the water pressure in the hose, an elastic movement of the sector of the hose that is framed and delineated as a consequence of affixing the circumferential rim 1157 of exit "pool" 1150 to the internal wall of the hose, would start.

In drip emitter 1140—and let it be emphasized again that the discussed subject matter is only an example, means 1110 for facilitating the spreading of the legs of the configured U of the exit "pool", is an array of cavities that comprise a pair of slits 1120 and 1122 that are formed on the inner sides of the U's legs wherein they extend along the inner walls of the exit "pool" 1150, and a pair of slits 1124 and 1126 that are formed on the outer sides of the legs of the U wherein they extend along the outer walls of the exit "pool" 1150 (in the illustrated configuration—each one as a slit that is made of two conic sectors that are converging one towards the other).

Any professional would understand that the subject matter as it is discussed is presented only as an example, and means 1110 for facilitating the spreading of the legs of the configured U legs, can be formed in other and different configurations, and also in a manner in which, in addition, the body component of the drip emitter (the component formed with the exit "pool'), is manufactured from a relatively soft raw material.

In other words, the invention is implementable at time instances wherein it is required to achieve an integral drip irrigation conduit (hose) with discrete drip emitters embedded in it, whether they are non pressure regulating type of emitters or it is to be pressure regulated/compensating drip emitters, with the water exit outlet from it having properties of "self" opening and "self" closing in accordance with and correlation to the water pressure prevailing in the hose.

The invention was described above wherein reference is made to "boat" like emitters, rectangular in their configuration—that are not regulated (the emitter depicted in FIGS. 3 to 10) and some that are regulated (for example—the emitter depicted in FIG. 11), but any professional would understand that the invention is implementable also in discrete integral drip emitters (that are not regulated or are regulated), that are made in another and different shape (for example—drip emitters in a disk shaped form or an oval configuration and so on).

any professional would also understand that using the term U configured, in a way to describe a characteristic cross section of an integral, discrete drip emitters in the region of the exit "pool", does not necessitates a symmetric structure. In other words, the professional would understand that the invention can be embodied and its application contains in its scope also a drip emitter wherein one leg of the configured U shaped profile is much thicker than the other, wherein in contradistinction to, for example, drip emitter 340 (see FIGS. 3 to 7), the exit "pool" does not extend in a symmetrical manner along the length axis of the drip emitter (for example—when within the scope of the thicker leg there are formed in it both the filtering means and the pressure reducing means, side by side, and therefore the drip emitter is asymmetrical rather than symmetrical).

Reference is being made to FIG. 12. FIG. 12 schematically depicts a variety of non-symmetrical non-regulated drip emitters wherein the invention which is the subject matter of this application is implementable as well.

Each one of drip emitters 1240, 1241 and 1243, comprises (as usual) an array assembly for entry of filtered water and a water pressure reducing means assembly (e.g.—a labyrinth) that is connected in series to a water flow into it from the array assembly for entry of filtered water and to a water exit from it onto the emitter's exit "pool" (respectively) 1250, 1251 and 1253.

As can be seen, in drip emitter 1240 the exit "pool" is formed wherein it is positioned between the filtered water entry assembly that is found on one end of the drip emitter and the labyrinth is formed on its other (second) end. In drip emitter 1241, the exit "pool" is formed at one end of the emitter while both the water entry assembly and the labyrinth are formed at the other end. In drip emitter 1243 the exit "pool" is formed wherein it extends along one side and parallel to the water entry assembly and the labyrinth, that are formed, both of them, one alongside the other, on its one side.

Each one of the drip emitters is also illustrated by a cross section view that presents the U configuration that is characteristic of the exit "pool" area, wherein in accordance with the invention, in each one of them there is implemented means for facilitating the spreading of the legs of the configured U resembling exit "pool" (see, respectively, slits and cavities assemblies 1210, 1211 and 1213).

Moreover, Any professional would also appreciate that in the invention there is also embodied a general method for opening and closing water outlet openings of an integral drip irrigation hose in which there is integrated at least one discrete drip emitter and this—in a dynamic manner and in accordance with and correlation to the water pressure prevailing in the hose. A method that includes the steps of providing an integral drip irrigation hose that— a. Integrated in it there is at least one discrete drip emitter that comprises a body component whose configuration is essentially rectangular, where on its one side that is suited to be affixed onto the inner wall of the hose, an exit "pool" is formed in a manner that instills on the cross section of the drip emitter a characteristic appearance resembling the letter U, wherein its legs are formed at their ends with an edge that constitutes part of a circumferential rim of the exit "pool" that is suited to be affixed onto the inner wall of the hose, and these legs are connected through the bottom of the exit "pool"; and b. The water outlet opening that is formed in a sector of the wall of the hose that is framed and delineated by the circumferential rim of the water exit "pool", is amenable to be opened upon pulling of the sector by its width dimension, on its two sides, and to be closed from the instant the pulling is stopped.

The method includes the step of spreading the legs of the U configured profile of the exit "pool", as the water pressure in the hose increases and loads the drip emitter with forces, while developing stresses in the U shaped cross section in a manner that leads to elastic movements, as said, of the legs of the U configuration and thus to the pulling of the sector of the hose's wall that was framed and delineated by the circumferential rim of the water exit "pool", in its width dimension, on its two sides.

While the above description contains many specifications, the professional reader should not construe these as limitations on the scope of the integral drip irrigation emitter with an easy spreadable exit pool and the scope of the integral drip irrigation hose (conduit) embedded such drip emitters, which are the subject matter of the invention, but merely examples of embodiments thereof. It will be apparent to those skilled in the art of designing and manufacturing drip irrigation systems that various modifications and variations can be made in the emitter and the pattern of the water outlet opening of the present invention without departing from the spirit or scope of the invention. Thus, it is intended that the present invention covers modifications and variations that come under the scope of the following claims and their equivalents.

The invention claimed is:

1. A discrete drip irrigation emitter that is suited to be integrally installed within a hose, that comprises:
   a body component having a first side suited for affixing onto an inner wall of a hose, thereby forming a water exit pool, the cross section of the water exit pool having a characteristic appearance resembling the letter U, wherein legs of the U-shaped cross-section of the water exit pool are formed having ends with an edge on the first side that constitutes a part of a circumferential rim of said water exit pool that is suited to be affixed onto an inner wall of said hose, and said legs are connected through a bottom of said water exit pool, and
   wherein said drip emitter is characterized by that:
   said drip emitter comprises in addition, means for facilitating spreading of said configured U's legs of said exit pool, so that after affixing said drip emitter onto the inner wall surface of said hose, and following water pressure increase within said hose, an elastic movement of the sector of the hose's wall that is framed and delineated as a consequence of affixing said circumferential rim of the exit pool onto the inner wall of said hose will take place unto opening a water outlet opening, and from the time the water pressure in the hose decreases, closing of said water outlet opening would occur, wherein said water outlet opening is formed as a slit that extends along said sector of the hose's wall; and
   wherein said means for facilitating spreading the configured U's legs of said exit pool, constitutes at least one cavity whose forming in said body component of the drip emitter causes a decrease of area inertia moment (known as second moment of area, second moment of inertia, area moment of inertia) at said U-shaped cross section, in a manner that after affixing said drip emitter onto an inner wall of a hose, and upon increase of water pressure in that hose and loading said drip emitter with forces, the development of stresses within said U-shaped cross section, would lead onto an elastic movement as said, of the configured U's legs, and thus to pulling said hose's wall sector that was framed and delineated by said circumferential rim of the water exit pool, at a width dimension and on two sides of said hose's wall sector, in a manner that would cause said slit opening for water passage outwards.

2. A drip irrigation emitter in accordance with claim 1, wherein:
   said means for facilitating spreading the legs of said U configuration of said exit pool includes an array of cavities that comprises:
   a slit that is formed on said drip emitter side that from an instant of affixing it onto said hose, is turned toward said hose's inside, and wherein said slit extends along at least a substantial part of said body component and covers at least a portion of said exit pool; and
   a pair of slits that are formed at the bottom of said exit pool, wherein they extend on its two sides, close to and in parallel in their direction to said exit pool walls that constitute said legs of the configured U and along at least a substantial part of said exit pool.

3. A drip irrigation emitter in accordance with claim 2, wherein:
   this drip emitter is a mono-component drip emitter that does not provide for pressure regulation and its body component, on its first side that is suited to being affixed onto an inner wall of a hose, is formed with filtering means and with means for reducing the water pressure; and
   with a water flow passage that connects to a water passage of filtered water from said filtering means to one end of said water pressure reducing means, and
   with a water exit opening that connects to a water passage of filtered water whose pressure was reduced, form a second end of said water pressure reducing means to said water exit pool; and
   wherein said exit pool is formed extended in its dimensions while it extends along substantially the entire length of said body component, and wherein on its one side along its entire length and parallel to it, extends said filtering means and constitutes a part of one leg of said U configuration, and on its other side extends said water pressure reducing means and constitutes a part of a second leg of said U configuration; and
   said flow passage is formed wherein it extends on a one end of said body component and across its width, and said water exit opening is formed on a second end of said body component.

4. A drip irrigation emitter in accordance with claim 3, wherein said forming of said exit pool is extended in its dimensions and substantially extends along an entire length of said body component, defines a lengthwise axis wherein said filtering means and said water pressure reducing means are formed symmetrically in relation to it.

5. A drip irrigation emitter in accordance with claim 4, wherein:
said slit that is formed on a side of said drip emitter that from an instant of its being affixed onto a hose, is turned towards said hose's inside, extends along said lengthwise axis; and
wherein said pair of slits that are formed at said exit pool's bottom, are formed symmetrically in relation to said lengthwise axis.

6. A drip irrigation emitter in accordance with claim 1, wherein said means for facilitating the spreading of the configured U's legs of said exit pool constitutes the manufacturing of the drip emitter from an elastic material, in a manner that as said, as the water pressure in the hose increases and loading said drip emitter with forces, development of stresses in said U shaped cross section would lead to elastic movements of said U's legs.

7. A drip irrigation emitter in accordance with claim 2, wherein:
said means for facilitating spreading the configured U's legs of said exit pool comprises in addition, also manufacturing of the drip emitter from an elastic material.

8. A drip irrigation emitter in accordance with claim 2, wherein:
said means for facilitating spreading the configured U's legs of said exit pool comprises in addition, also the manufacturing of the drip emitter from an elastic material.

9. A drip irrigation emitter in accordance with claim 1 wherein said body component is of an essentially rectangular "boat" like configuration.

10. An integral drip irrigation hose wherein there is embedded in it at least one discrete drip emitter in accordance with claim 1.

11. An integral drip irrigation hose in accordance with claim 10, wherein the water outlet opening that is formed at a wall of the hose opposite said exit pool and within its boundaries, is in a configuration of at least one thin and elongated slit that extends in its direction parallel to the walls of said exit pool that constitute said U configuration's legs and is located between them.

12. A method using the discrete drip irrigation emitter of claim 1, the method comprising the steps of:
opening and closing said water outlet opening of said integral drip irrigation hose in which at least one of said discrete drip emitter is integrated in said hose and wherein said opening and closing is performed in accordance with and in correlation to the water pressure prevailing in the hose;
providing said integral drip irrigation hose in which there is integrated at least one of said drip emitter that comprises:
a. said body component having said first side suited to be affixed onto the inner wall of the hose, thereby forming an exit "pool" in a manner that instills on the cross section of the drip emitter a characteristic appearance resembling the letter U, wherein its legs are formed at their ends with an edge that constitutes part of a circumferential rim of the exit "pool" that is suited to be affixed onto the inner wall of the hose, and the legs are connected through the bottom of said exit "pool"; and
b. said water outlet opening that is formed as said slit in said sector of the wall of the hose that is framed and delineated by the circumferential rim of the water exit "pool", the water outlet opening being amenable to be opened upon pulling of said width dimension of the sector by the two sides of the sector, and to be closed from the instant the pulling is stopped; and
spreading the legs of the U configured profile of the exit "pool", as the water pressure in the hose increases and loads the drip emitter with forces, while developing stresses in the U shaped cross section in a manner that leads to elastic movements, as said, of the legs of the U configuration and thus to pulling the sector of the hose's wall that was framed and delineated by the circumferential rim of the water exit "pool", in the width dimension of the sector, on the two sides of the sector.

\* \* \* \* \*